United States Patent
Pesek et al.

[11] 3,912,837
[45] Oct. 14, 1975

[54] METHOD OF STABILIZATION OF LIGNOCELLULOSE MATERIALS

[75] Inventors: Miroslav Pesek, Pardubice; Frantisek Hrabak, Prague, both of Czechoslovakia

[73] Assignee: Ustav pro vyzkum, vyrobu a vyuziti radiosotopu, Prague, Czechoslovakia

[22] Filed: Apr. 2, 1973

[21] Appl. No.: 346,762

[30] Foreign Application Priority Data
Mar. 31, 1972 Czechoslovakia .................. 2188/72

[52] U.S. Cl. .......... 427/393; 260/86.3; 260/89.5 H; 427/36; 427/44
[51] Int. Cl.² .......................................... B05D 3/02
[58] Field of Search ....... 117/148, 161 UB, 161 UC, 117/93.31, 136; 260/89.5 H, 86.3

[56] References Cited
UNITED STATES PATENTS

| | | | |
|---|---|---|---|
| 2,861,060 | 11/1958 | Goode | 260/89.5 H |
| 3,169,079 | 2/1965 | Ferington et al. | 117/148 |
| 3,184,440 | 5/1965 | Chadha et al. | 117/148 |
| 3,240,619 | 3/1966 | Winchester | 117/148 |
| 3,248,374 | 4/1966 | Covington | 117/148 |

*Primary Examiner*—William R. Trenor

[57] ABSTRACT

Method of stabilizing lignocellulose materials. The lignocellulose materials are saturated by 1,2,2,2-tetrachloroethyl esters of acrylic and/or methacrylic acid of general formula.

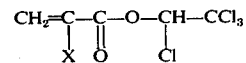

where $X = H, CH_3$; or by a mixture of these esters with unsaturated compounds which copolymerize with said esters of above general formula, and curing the monomers in the lignocellulose mass.

8 Claims, No Drawings

METHOD OF STABILIZATION OF LIGNOCELLULOSE MATERIALS

The invention relates to the method of stabilization of lignocellulose materials by means of saturation by 1,2,2,2-tetrachlorethyl - esters of acrylyc and/or methacrylic acid of general formula

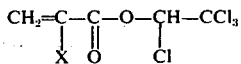

where $X = H$, $CH_3$, or a mixture of these esters with a vinylic or diene or other polymerizable compounds; and then polymerization of the monomeric component of such impregnated material.

There are several methods of stabilization of the lignocellulose materials. A variety of impregnation methods are known, using diverse impregnation mixtures suitable for the stabilization of lignocellulose materials. To the polymerizable monomeric mixtures belong the methylmethacrylate; mixture of styrene and acrylonitrile; unsaturated polyester resins; epoxy resin; and several others. Using any of the above mentioned mixtures the physical characteristics of original lignocellulose materials are improved; at the same time, however, the lignocellulose materials stabilized by this method are much more combustible.

In the method according to the invention the physical properties of original lignocellulose material are improved; and due to the self-extinguishing ability of lower combustibility of the polymerized impregnation mixture, the combustibility of stabilized lignocellulose materials is decreased as well; this fact is very important for some industrial applications of such stabilized materials. Another advantage of the solution according to the invention is that 1,2,2,2 - tetrachloraethyl esters of acrylic and methacrylic acid have higher boiling point than monomers like methylmethacrylate, acrylonitrile, vinylacetate, and others; therefore their evaporation from the surface of impregnated material is lower and thus the higher quality surface may be obtained on lignocellulose materials stabilized by means of these monomers.

Another important feature is a good polymerizability of these esters according to general formula (I) e.g. by ionizing radiation.

The method according to the invention is well suited for the stabilization of wood; various semiproducts or products made of wood; groundwood pulp; products made of groundwood pulp; cardboard; paper; and products made of cardboard and paper, The saturation of lignocellulose material by these esters of general formula (I) or by their mixtures with vinyl or diene or other polymerizable compounds may be done either by pressure vacuum impregnation or simply by dipping or even spraying and/or coating, or by other method of application if a thin layer of lignocellulose material is to be stabilized. For the better penetration of monomeric mixture into the lignocellulose material various swelling agents or solvents of monomeric mixtures may be added to the impregnation mixture. Water, ethanol, methanol, acetone, and others may be used for this purpose. Later the monomeric impregnation mixtures are polymerized and thus the stabilization of lignocellulose material is obtained.

1,2,2,2-tetrachloroethyl esters of acrylic or methacrylic acid of general formula (I) may be used for stabilization either alone or in the mixture with vinyl or diene monomers or with other polymerizable compounds, e.g. with methylmethacrylate and other acrylates or methacrylates; with styrene and its derivatives; acrylonitrile; vinylacetate, and other vinylic monomers; divinylbenzene; chloroprene and other diene compounds; with allyl monomers; and polyester, alkyd, and other resins. In the impregnation mixture monomers may be partialy polymerized. Various additives may be introduced into the impregnation mixture for improving of characteristics of lignocellulose materials after stabilization. Among others various dyestuffs may be added; anti-combustion agents, e.g. compounds of phosphorus, antimony, etc.; insecticides; and hydrophobic agents. Further may be added organic peroxides, hydroperoxides or peresters or other known initiators, accelerators or retarders of polymerization.

In the second stage after the saturation of lignocellulose material by impregnation mixture, the monomeric impregnation mixture is polymerized. The polymerization process is realized either by means of polymerization initiators introduced into the stabilized materials, e.g. by increased temperature; or the monomeric mixture containing esters of general formula (I) may be polymerized by means of ionizing radiation. As radiation sources either various isotopic gamma- or beta emitters, containing e.g. $^{60}Co$, $^{137}Cs$, $^{90}Sr$, etc.; or particle accelerators of various types, e.g. Van de Graaf accelerators, linear accelerators, insulated coil transformers, etc.; or various X-ray sources; or other sources of ionizing radiation may be used. The advantage of use of the ionizing radiation for polymerization process initiation is in its penetrability and thus possibility to initiate the polymerization process uniformly in the whole mass of stabilized material. The polymerization process by means of ionizing radiation may be carried out at normal and/or at advantageously increased temperature. The combined method of polymerization of the impregnation mixture may be used as well: i.e., using ionizing radiation together with chemical polymerization initiators, or together with increased temperature or increased temperature alone. The saturation of lignocellulose materials by monomeric mixtures as well as the polymerization may be advantageously carried out in an inert gas atmosphere, e.g. in nitrogen, carbon dioxide, natural gas, or other industrial gasses containing minimum amount of oxygen.

In this way stabilized lignocellulose materials may be prepared with improved physical characteristics, and with decreased combustibility.

The methods of stabilization of the lignocellulose materials according to the invention are elucidated in the following examples:

EXAMPLES

EXAMPLE 1

A sample of poplar wood was evacuated in a glass ampoule for 15 minutes at 5 Torr; the vacuum was removed by the admission of nitrogen; the evacuation was repeated; 1,2,2,2-tetrachlorethylacrylate was admitted; vacuum was removed by nitrogen and monomer from the ampoules forced out by nitrogen overpressure; and finally the saturated sample of poplar wood in the glass ampoule was exposed to gamma radiation of $^{60}Co$ with dose rate .8 Mrad/hr up to the total dose of 1.6 Mrad. The sample of poplar wood stabilized in this way contained more than three times of poly(1,2,2,2-tetrachlorethylacrylate) with respect to the total mass of original wood. The wood stabilized like this had an increased hardness, decreased water absorption, and reduced combustibility.

EXAMPLE 2

Similarly to Example 1; 1,2,2,2-tetrachlorethylmethacrylate was used. A sample of poplar wood stabilized in this way contained more than three times the mass of poly(1,2,2,2-tetrachlormethylmethacrylate), with respect to the mass of original wood. The wood stabilized like this had an increased hardness, decreased water absorption, and reduced combustibility.

EXAMPLE 3

The double-layer corrugated paperboard was sprayed on both sides by a mixture of 89 per cent (by volume) of 1,2,2,2-tetrachloracrylate, 1 per cent of antimony trioxide, and 10 per cent of unsaturated polyester resin CHS Polyester 115. The paperboard saturated in this way was irradiated by the accelerated electrons with the energy of 4 MeV from linear electron accelerator up to a total dose of 6 Mrad. A stabilized corrugated paperboard thus obtained had increased strength, improved wet mechanical characteristics, and reduced combustibility.

EXAMPLE 4

Similarly to Example 3; 1,2,2,2-tetrachloroethylmethacrylate was used. The product had similar characteristics.

EXAMPLE 5

A sample of wooden chipboard was saturated in vacuum, similarly to Example 1, by an impregnation mixture containing 90 per cent (by volume) of 1,2,2,2-tetrachlorethylacrylate and 10 per cent of divinylbenzene. To this mixture 2 per cent of dibenzolylperoxide paste (50 per cent of dibenzolylperoxide in dibutylphthalate) was added. The impregnated chipboard was heated for 8 hours at 80 deg. Centrigrade. A chipboard stabilized like this had a decreased absorption capacity, increased hardness, and reduced combustibility.

EXAMPLE 6

Similarly to Example 5; 1,2,2,2-tetrachloroethylmethacrylate was used. The product had similarly improved characteristics.

EXAMPLE 7

A beech veneer .8 mm thick was impregnated similarly to Example 1 by a mixture of 90 per cent (by volume) pre-polymer of 1,2,2,2-tetrachlorethylacrylate (viscosity 370 cP at 25 deg. Centigrade) and 10 per cent of acetone. An impregnated veneer was irradiated in nitrogen atmosphere by accelerated electrons with the energy 4 MeV up to the total dose of 6 Mrad. After the irradiation acetone was evaporated in the drying oven at 90° C. A veneer stabilized like this had improved physical characteristics and reduced combustibility.

EXAMPLE 8

Similarly to Example 7 a pre-polymer of 1,2,2,2tetrachloroethylmethacrylate was used. The product had similarly improved characteristics.

Although the invention is illustrated and described with reference to a plurality of preferred embodiments thereof, it is to be expressly understood that it is in no way limited to the disclosure of such a plurality of preferred embodiments but is capable of numerous modifications within the scope ot the appended claims.

We claim:
1. Method for the stabilization of wood and derivatives thereof which comprises the steps of
   a. impregnating said wood or derivative thereof with at least one member selected from the group consisting of
      1. an ester having the general formula

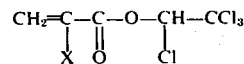

wherein X is selected from the group consisting of hydrogen and methyl radicals, and
      2. a mixture of said at least one member with an unsaturated monomer selected from the group consisting of vinyl and diene compounds, said mixture containing at least 89%, by volume, ester, and
   b. polymerizing the resultant impregnated composition.

2. Method of stabilization in accordance with claim 1 wherein said wood and derivatives thereof are impregnated with an admixture of 1,2,2,2-tetrachloroethylacrylate with an unsaturated monomer selected from the group consisting of vinyl and diene compounds.

3. Method of stabilization in accordance with claim 1 wherein said wood and derivatives thereof are impregnated with an admixture of 1,2,2,2-tetrachloroethylmethacrylate with an unsaturated monomer selected from the group consisting of vinyl and diene compounds.

4. Method of stabilization in accordance with claim 1 wherein the composition employed as the impregnant is pre-polymerized prior to impregnation.

5. Method of stabilization in accordance with claim 1 wherein swelling agents are added to the impregnation composition.

6. Method of stabilization in accordance with claim 2 wherein swelling agents are added to the impregnation mixture.

7. Method of stabilization in accordance with claim 3 wherein swelling agents are added to the impregnation mixture.

8. Method of stabilization in accordance with claim 4 wherein swelling agents are added to the impregnation mixture.

* * * * *